(12) United States Patent
Choi et al.

(10) Patent No.: US 7,580,470 B2
(45) Date of Patent: Aug. 25, 2009

(54) APPARATUS FOR RECOVERING E8-VSB MAP INFORMATION AND METHOD THEREOF

(75) Inventors: In Hwan Choi, Gyeonggi-do (KR); Kyung Won Kang, Seoul (KR)

(73) Assignee: LG Electronics, Inc., Seoul (KR)

( * ) Notice: Subject to any disclaimer, the term of this patent is extended or adjusted under 35 U.S.C. 154(b) by 607 days.

(21) Appl. No.: 11/312,130

(22) Filed: Dec. 19, 2005

(65) Prior Publication Data

US 2006/0146955 A1    Jul. 6, 2006

(30) Foreign Application Priority Data

Dec. 20, 2004    (KR) .................. 10-2004-0108781

(51) Int. Cl.
*H04L 7/04* (2006.01)
(52) U.S. Cl. .................. 375/270; 375/362; 375/150; 375/152; 375/142; 375/143; 341/50; 341/51; 341/67

(58) Field of Classification Search .................. 375/362
See application file for complete search history.

(56) References Cited

U.S. PATENT DOCUMENTS

| 5,926,488 A | * | 7/1999 | Khayrallah .................. 714/52 |
| 6,924,753 B2 | * | 8/2005 | Bretl et al. .................. 341/50 |
| 2003/0169189 A1 | | 9/2003 | Bretl et al. |

* cited by examiner

*Primary Examiner*—Shuwang Liu
*Assistant Examiner*—Lihong Yu
(74) *Attorney, Agent, or Firm*—Lee, Hong, Degerman, Kang & Waimey

(57) ABSTRACT

A Kerdock decoder of the present invention generates correlation reliability from a relation between correlation values to output together with a Kerdock-decoded map data. A map deciding unit receives a field sync signal, a field identifying signal, the Kerdock-decoded map data and the correlation reliability to identify whether a current field is an odd or even field and whether there is a map change in case of the even field. And, the map deciding unit decides a current map data by performing map acquisition and tracking according to the corresponding result.

20 Claims, 8 Drawing Sheets

APPARATUS FOR RECOVERING E8-VSB MAP INFORMATION AND METHOD THEREOF

This application claims the benefit of the Korean Patent Application No. 10-2004-0108781, filed on Dec. 20, 2004, which is hereby incorporated by reference as if fully set forth herein.

BACKGROUND OF THE INVENTION

1. Field of the Invention

The present invention relates to an E8-VSB reception system receiving a plurality of enhanced data encoded at different coding rates, and more particularly, to an apparatus for recovering E8-VSB map information and method thereof.

2. Discussion of the Related Art

The ATSC (advanced television systems committee) 8VSB (vestigial sideband) transmission was adopted by U.S.A. as the standard for terrestrial digital broadcasting in 1995, which has been performed since 1998. And, Korea has adopted the same ATSC 8VSB transmission system as the standard in broadcasting.

Specifications of the ATSC 8VSB transmission system were established to basically target high quality of image. Yet, the demand for a transmission specification of a system enabling a stable reception despite the accompanied degradation of image quality or a system enabling data communications requesting more stable reception than that of a video signal due to the characteristics of contents has risen. Moreover, the additional transmission specifications are stipulated within a range that avoids causing bad influence to the system receiving a conventional ATSC 8VSB signal. And, it is also stipulated that a receiver according to a new specification can receive both an enhanced 8-VSB signal (hereinafter abbreviated E8-VSB) and the conventional ATSC 8VSB signal.

Hence, the E8-VSB transmission/reception system employs the conventional 8VSB system as it is, adds a new service, and enables the newly added service to have a reception better than that of an old service. And, the E8-VSB transmission/reception system enables the old service to have a more stable reception performance attributed to influence of the added service.

SUMMARY OF THE INVENTION

Accordingly, the present invention is directed to an apparatus for recovering E8-VSB map information and method thereof that substantially obviate one or more problems due to limitations and disadvantages of the related art.

An object of the present invention is to provide an apparatus for recovering E8-VSB map information and method thereof, by which the received main data multiplexed with a plurality of enhanced data encoded at different coding rates can be de-multiplexed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for recovering map information in an E8-VSB reception system, which recovers enhanced mode map information including multiplexing information of an enhanced data and a main data, according to the present invention includes a frame synchronization recovering unit generating a field sync signal and a field identifying signal indicating an even field or an odd field from an inputted data symbol by performing a frame synchronization recovery, a symbol extracting unit extracting symbols corresponding to an enhanced mode map transmitted by being inserted in the field sync signal from the inputted data symbol using an output of the frame synchronization recovering unit, the symbol extracting unit outputting the extracted symbols intact in case of the odd field, the symbol extracting unit inverting values of the map symbols to output in case of the even field, a Kerdock decoder outputting a Kerdock-decoded map data and a corresponding correlation reliability value using correlation between the map symbols outputted from the symbol extracting unit and each Kerdock code generated inside, a map deciding unit identifying whether a current field is the odd field or the even field by receiving the field sync signal and the field identifying signal from the frame synchronization recovering unit and by receiving the map data and the correlation reliability value from the Kerdock decoder, the map deciding unit deciding a map data to be used for the current field by identifying whether there is a map change in case of the even field, and a map interpreting unit detecting an enhanced segment information inserted in one field and a packing mode from the current map data decided by the map deciding unit.

Preferably, the Kerdock decoder includes a serial-to-parallel converting unit storing the symbols corresponding to the enhanced mode map outputted in serial from the symbol extracting unit and then outputting the stored symbols in parallel, a counter sequentially performing countings to a value of a preset range to output count values, a Kerdock encoder outputting Kerdock codes by performing Kerdock encoding on the count values outputted from the counter, respectively, a symbol correlating unit performing a process of calculating and outputting correlation values between the Kerdock codes outputted from the Kerdock encoder and the map symbols outputted in parallel from the serial-to-parallel converting unit on the entire Kerdock codes corresponding to the count values outputted from the counter, respectively, and a maximum value finding unit selecting the count value corresponding to a maximum value among the correlation values calculated and outputted from the symbol correlating unit as the Kerdock-decoded map data, the maximum value finding unit outputting the selected map data and a corresponding correlation value.

Preferably, the Kerdock decoder includes a serial-to-parallel converting unit storing the sixty-four symbols corresponding to the enhanced mode map outputted in serial from the symbol extracting unit and then outputting the stored symbols in parallel, a 12-bit counter sequentially counting values 0 to 4,095 to output if the sixty-four symbols are entirely stored in the serial-to-parallel converting unit to output count values, a Kerdock encoder outputting 64-bit Kerdock codes by performing (64,12) Kerdock encoding on the count values outputted from the 12-bit counter, respectively, a symbol correlating unit performing a process of calculating and outputting correlation values between the 64-bit Kerdock codes outputted from the Kerdock encoder and the sixty-four map symbols outputted in parallel from the serial-to-parallel converting unit on the entire Kerdock codes corresponding to the 4,096 count values outputted from the 12-bit counter, respectively, and a maximum value finding unit selecting the count value corresponding to a maximum value among the 4,096 correlation values calculated and outputted from the symbol correlating unit as the Kerdock-decoded map data to output, the maximum value finding unit generating to output a corresponding correlation value from a relation between the correlation values.

In another aspect of the present invention, a method of recovering map information in an E8-VSB reception system, which recovers enhanced mode map information including multiplexing information of an enhanced data and a main data, includes a step (a) of generating a field sync signal and a field identifying signal indicating an even field or an odd field from an inputted data symbol by performing a frame synchronization recovery, a step (b) of extracting symbols corresponding to an enhanced mode map transmitted by being inserted in the field sync signal from the inputted data symbol using the field sync signal and the field identifying signal, outputting the extracted symbols intact in case of the odd field, and inverting values of the map symbols to output in case of the even field, a step (c) of outputting a Kerdock-decoded map data and a corresponding correlation reliability value using correlation between the map symbols and each Kerdock code generated inside, a step (d) of deciding a current map data by performing map acquisition and tracking processes according to a result from identifying whether a current field is the odd field or the even field and whether there is a map change by receiving the field sync signal, the field identifying signal, the map data and the correlation reliability value, and a step (e) of detecting an enhanced segment information inserted in one field and a packing mode from the current map data decided by the step (d).

Preferably, the step (c) includes the steps of storing the N-symbols corresponding to the enhanced mode map outputted in serial from the step (b) and then outputting the stored symbols in parallel, sequentially performing countings to a value of a preset range to output count values, outputting N-bit Kerdock codes by performing Kerdock encoding on the count values outputted from the counter, respectively, performing a process of calculating and outputting correlation values between the N-bit Kerdock codes and the N-map symbols outputted in parallel on the entire Kerdock codes corresponding to the count values, respectively, and selecting the count value corresponding to a maximum value among the correlation values calculated and outputted from the above step as the Kerdock-decoded map data to output and generating to output a corresponding correlation value from a relation between the correlation values.

In another aspect of the present invention, a method of recovering map information in an E8-VSB reception system, which recovers enhanced mode map information including multiplexing information of an enhanced data and a main data, includes a step (a) of generating a field sync signal and a field identifying signal indicating an even field or an odd field from an inputted data symbol by performing a frame synchronization recovery, a step (b) of extracting symbols corresponding to an enhanced mode map transmitted by being inserted in the field sync signal from the inputted data symbol using the field sync signal and the field identifying signal, outputting the extracted symbols intact in case of the odd field, and inverting values of the map symbols to output in case of the even field, a step (c) of outputting a Kerdock-decoded map data using correlation between the map symbols and each Kerdock code generated inside, a step (d) of deciding a current map data by performing map acquisition and tracking processes according to a result from identifying whether a current field is the odd field or the even field and whether there is a map change by receiving the field sync signal, the field identifying signal and the Kerdock-decoded map data, and a step (e) of detecting an enhanced segment information inserted in one field and a packing mode from the current map data decided by the step (d).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, the E8-VSB transmission system can transmit popularized MPEG-4 pictures or various supplementary data (e.g., program executing file, stock information, etc.) via enhanced data. And, the E8-VSB transmission system can transmit MPEG-2 pictures and Dolby sound data.

Hereinafter, for convenience of description, the conventional MPEG-2 picture is defined as a main data or main symbol. In this case, compared to the main data, the enhanced data performs additional error correction coding. A ½ enhanced data among the enhanced data (or enhanced symbol) means a data additionally coded at a coding rate corresponding to a half coding rate of the main data. And, a ¼ enhanced data among the enhanced data (or enhanced symbol) means a data additionally coded at a coding rate a quarter coding rate of the main data. Hence, these enhanced data have better reception performance in the interference attributed to noise and multi-path occurring in channel than that of the main data. In particular, the ¼ enhanced data coded at the ¼ coding rate has better performance than that of the ½ enhanced data coded at the ½ coding rate.

According to enhanced mode map information, the ½ enhanced data and the ¼ enhanced data are multiplexed into packet units and the multiplexed enhanced and main data are multiplexed into segment units to transmit to a transmitting side.

In this case, multiplexing information for multiplexing the ½ and ¼ enhanced data together or multiplexing information for multiplexing the multiplexed enhanced data with main data again is called enhanced mode map information (or E8-VSB map information). And, the enhanced mode map information is inserted in a field sync segment to be transmitted to the receiving side.

In a VSB transmission system, a frame is constructed with two data fields, i.e., an odd field and an even field. Each field includes one field sync segment and three hundred twelve data segments. And, each of the data segments includes a 4-symbol data segment sync signal and 828-symbol data.

Figure 1:
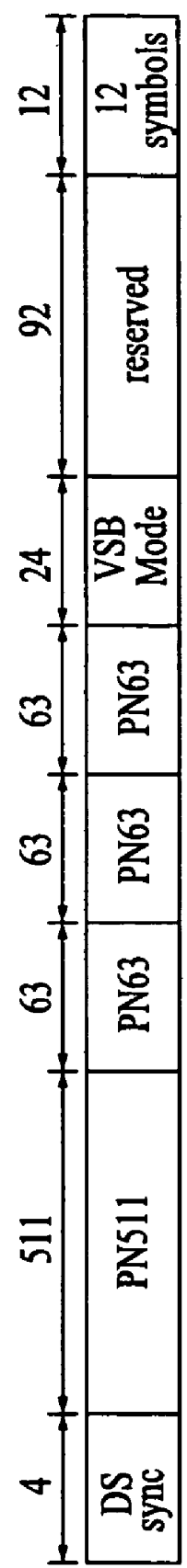
FIG. 1 is a structural diagram of a general field sync segment.

One field sync segment, as shown in FIG. 1, includes 1-data segment length. A data segment sync pattern exists in first four symbols, a pseudo random sequence of PN 511, PN 63, PN 63 and PN 63 follows the data segment sync pattern in order, and VSB mode associated information exists in the following twenty-four symbols. In this case, polarity of the second one of the three PN 63 sections alternates each time. Namely, '1' is changed into '0' or '0' is changed into '1'. Hence, according to the polarity of the second PN 63, one frame can be divided into even and odd fields.

The enhanced mode map information is inserted in the first 64-symbol in an reserved area within the field sync segment shown in FIG. 1 to be transmitted.

In doing so, the enhanced mode map information is inserted in a manner of being coded by Kerdock (64,12) code. A polarity of Kerdock codeword is inverted in an even (negative PN 63) data field. As Kerdock coding algorithm is known to the public, its detailed explanation is skipped in the following description.

Figure 2:
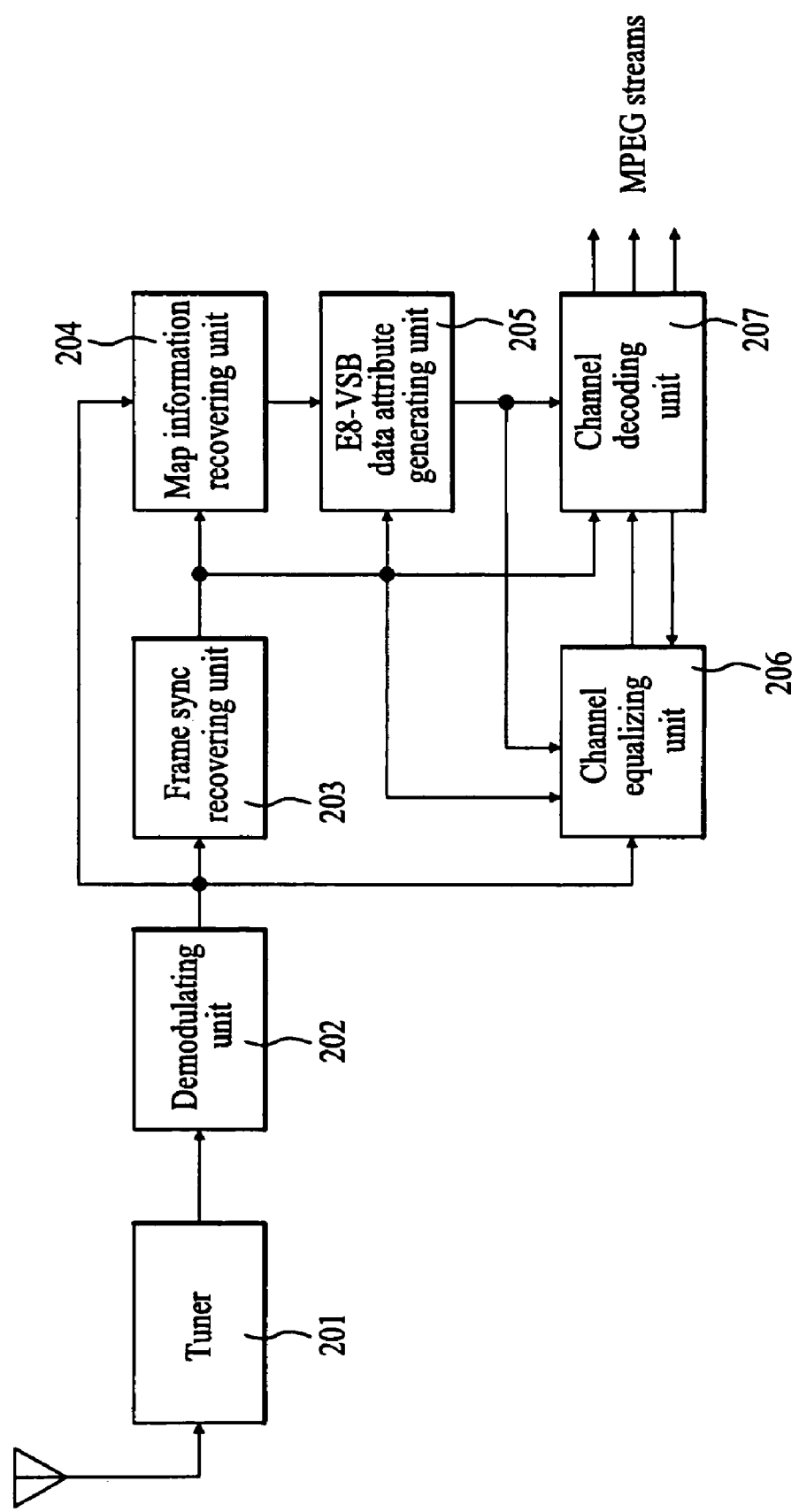
FIG. 2 is a schematic block diagram of an E8-VSB reception system according to the present invention.

FIG. 2 is a schematic block diagram of an E8-VSB reception system for receiving an E8-VSB signal multiplexed and transmitted from the above-explained E8-VSB transmission system.

Referring to FIG. 2, if an E8-VSB-modulated RF signal is received via an antenna, a tuner 201 selects an RF signal of a specific channel only by tuning, converts the selected signal to an IF signal, and then outputs the IF signal to a demodulating unit 202. The demodulating unit 202 carries out VSB demodulation such as automatic gain control (AGC), A/D conversion, carrier recovery, timing recovery and the like on the IF signal and then outputs the demodulated signal to a frame sync recovering unit 203, an E8-VSB map information recovering unit 204 and a channel equalizing unit 206.

The frame sync recovering unit 203 detects a field sync signal and segment sync signal within a VSB data frame from an output of the demodulating unit 203 and/or an output of the channel equalizing unit 206 and then outputs the detected signals to the E8-VSB map information recovering unit 204, an E8-VSB data attribute generating unit 205, the channel equalizing unit 206 and a channel decoder 207.

The E8-VSB map information recovering unit 204 recovers enhanced mode map information of a current transmitted field from the output of the demodulating unit 202 and/or the output of the channel equalizing unit 206 and then provides the enhanced mode map information to the E8-VSB data attribute generating unit 205. In this case, the enhanced mode map information includes information indicating how main data, ½ enhanced data and ¼ enhanced data are multiplexed.

The E8-VSB data attribute generating unit 205 generates attribute information of current E8-VSB data, which instructs every attribute of each data of an E8-VSB signal by the enhanced mode map information of the current field and the field sync signal. The E8-VSB data is divided by symbol unit, byte unit and packet unit, whereby each attribute is needed.

In this case, the E8-VSB data attribute generating unit 205 provides attribute information of a current E8-VSB symbol to the channel equalizing unit 206 and the channel decoder 207. Hence, the channel equalizing unit 206 can perform enhanced equalization and the channel decoder 207 can perform channel decoding suitable for a currently received mode.

Namely, the channel equalizing unit 206 receives a decision value of the channel decoder 207 in the rear end and the symbol attribute information of the E8-VSB data attribute generating unit 205, compensates channel distortion included in the signal VSB-demodulated by the demodulating unit 202, and then outputs the compensated signal to the channel decoder 207.

And, the channel decoder 207 decodes a signal equalized in a corresponding mode by receiving the E8-VSB symbol attribute information indicating multiplexing information of a currently received E8-VSB signal (main MPEG packets, enhanced ½ MPEG packets, enhanced ¼ MPEG packets) from the E8-VSB data attribute generating unit 205.

Figure 3:
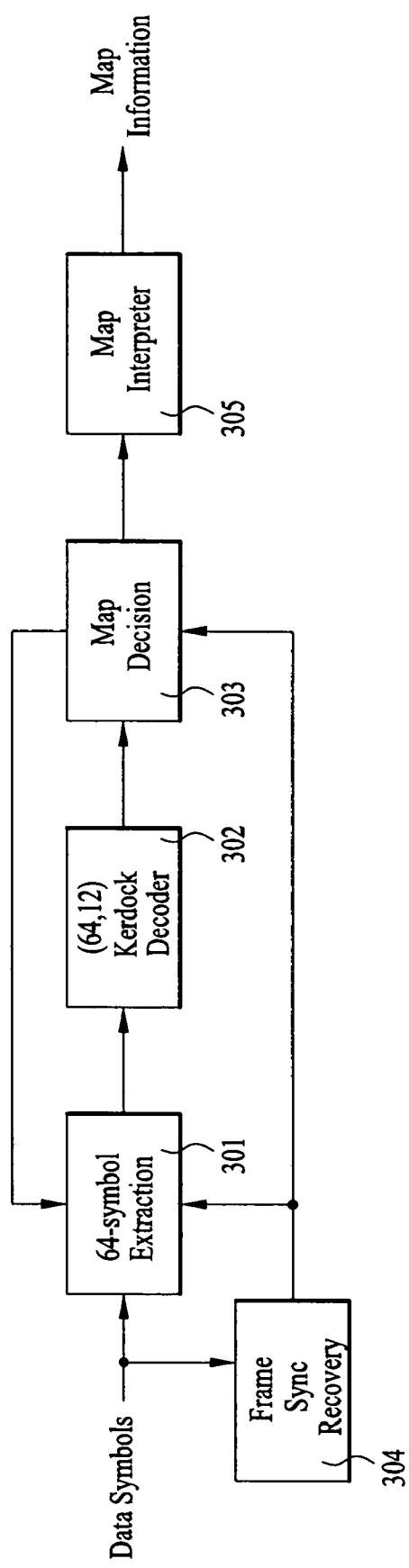
FIG. 3 is a detailed block diagram of an E8-VSB map recovering unit in FIG. 2.

FIG. 3 is a detailed block diagram of an E8-VSB map recovering unit according to one embodiment of the present invention.

Referring to FIG. 3, an E8-VSB map recovering unit according to one embodiment of the present invention includes a map symbol extracting unit 301 extracting enhanced mode map symbols from a data symbol outputted from the demodulating unit 202, a Kerdock decoder 302 decoding the extracted symbols according to Kerdock decoding algorithm, a frame sync recovering unit 304 performing frame sync recovery on the data symbol outputted from the demodulating unit 202 to output a field sync signal and a field identifying signal indicating an even or odd field, a map deciding unit 303 deciding a currently used map using map data decoded and outputted from the Kerdock decoder 302, confidence of the map data and the field sync signal, and a map interpreting unit 305 converting the map decided by the map deciding unit 303 to information to be practically used.

The above-configured map information recovering apparatus according to the present invention performs a work of extracting the enhanced mode map information inserted in a field sync section in the E8-VSB transmission system to receive the E8-VSB signal.

In doing so, in order for the map information recovering apparatus to obtain the enhanced mode map information indicating the E8-VSB signal from the received signal, a frame of the E8-VSB signal needs to be synchronized.

Hence, the frame sync recovering unit 304 can recover the frame sync by taking correlation with the received data using the data segment, one PN511 and three PN63's included in the field sync segment shown in FIG. 1. Using the fact that the middle one of the three PN63's has a positive polarity in case of an odd field or a negative polarity in case of an even field, it is identified whether a current field is an odd field or an even field. Namely, the frame sync recovering unit 304 performs the frame sync recovery on the inputted data symbol to detect the field sync signal and the field identifying signal indicating whether the current field is the even or odd field are detected. The frame sync recovering unit 304 then outputs detected signals to the map information extracting unit 301 and the map deciding unit 303.

If the inputted data symbol indicates the field sync signal, the map symbol extracting unit 301 extracts 64 symbols corresponding to the enhanced mode map from the field sync segment and then outputs the extracted symbols to the Kerdock decoder 302. In doing so, the map symbol extracting unit 301 inverts a value of the symbol to output in case of the even field.

In this case, the sixty-four symbols are located at the first sixty-four positions of ninety-two reserved symbols within the field sync segment shown in FIG. 1 and have the same polarity of the middle one of the three PN63's. Namely, in the E8-VSB transmission system, in case of the odd field, the enhanced mode map information is transmitted as the symbol having the positive polarity. And, in case of the even field, the enhanced mode map information is transmitted as the symbol having the negative polarity, i.e., sign-inverted symbol. So, after having extracted sixty-four symbols having the enhance mode map information from the data symbol using the field sync signal and the field identifying signal, the map symbol extracting unit 301 outputs the corresponding value to the Kerdock decoder 302 as it is if the field from which sixty-four symbols are extracted is the odd field. If the field from which sixty-four symbols are extracted is the even field, the map symbol extracting unit 301 preferentially inverts the corresponding value to output to the Kerdock decoder 302.

Figure 4:
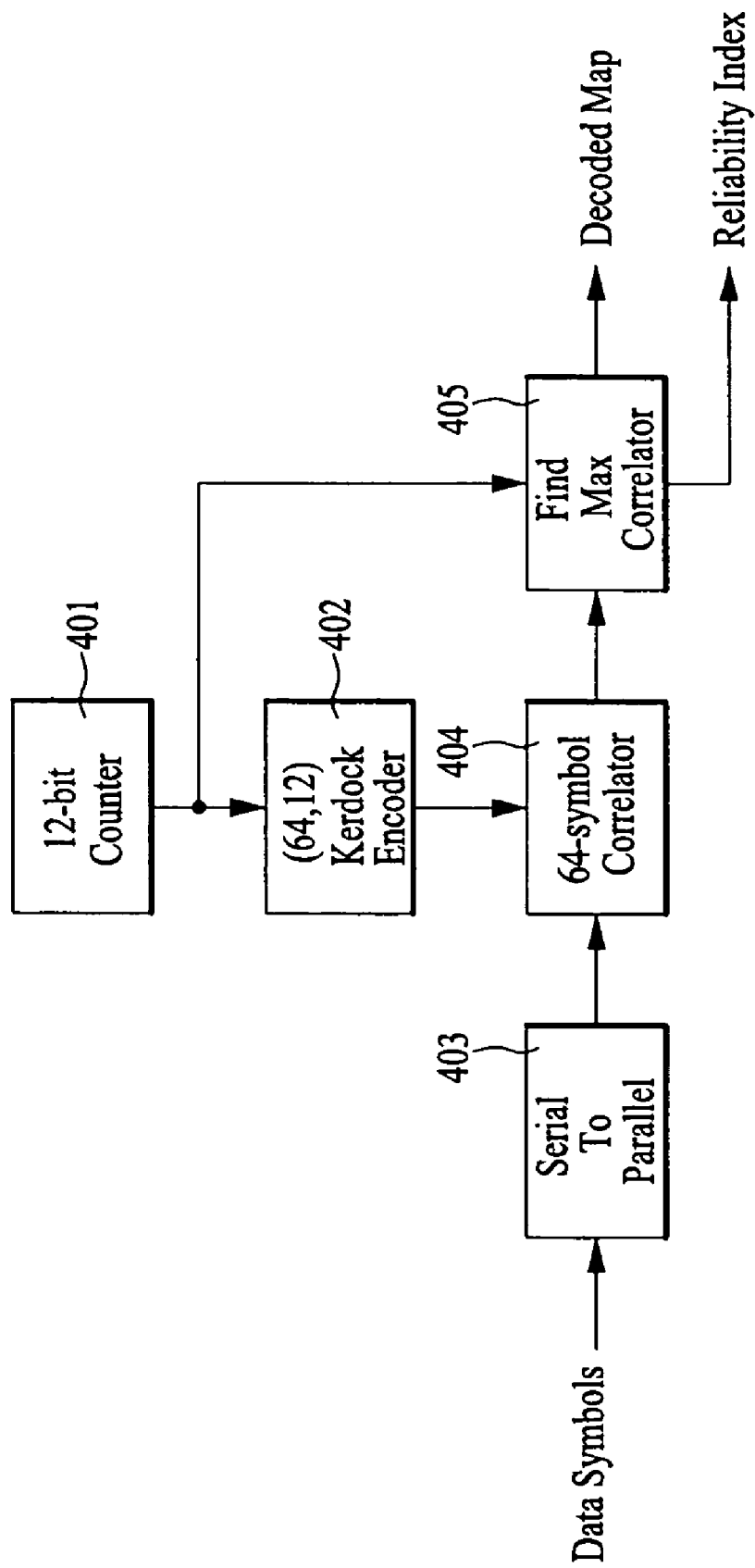
FIG. 4 is a detailed block diagram of a Kerdock decoder in FIG. 3.

FIG. 4 is a detailed block diagram of the (64,12) Kerdock decoder 302.

Referring to FIG. 4, the Kerdock decoder includes a 12-bit counter 401, a Kerdock encoder 402, a serial-to-parallel converting unit 403, a symbol correlating unit 404 and a maximum value finding unit 405.

Namely, data symbols outputted from the map symbol extracting unit 301 correspond to sixty-four Kerdock-encoded symbol data. Hence, the serial-to-parallel converting unit 403 stores the sequentially inputted sixty-four symbols in a memory device and simultaneously outputs the sixty-four symbols to refer to in parallel. In doing so, once the sixty-four symbols are entirely inputted to the serial-to-parallel converting unit 403, the 12-bit counter 401 sequentially generates values 0 to 4,095 to output to the Kerdock encoder 402. The Kerdock encoder 402 performs (64,12) Kerdock encoding on one value outputted from the 12-bit counter 401 to obtain a 64-bit value and then outputs the 64-bit value to the symbol correlating unit 404.

The symbol correlating unit 404 calculates a correlation value between the 64-bit value encoded by the Kerdock encoder 402 and the sixty-four symbols outputted in parallel from the serial-to-parallel converting unit 403 and then outputs the correlation value to the maximum value finding unit 405. As such a process is carried out on each of the count values 0 to 4,095 outputted from the 12-bit counter 401, 4,096 correlation values for the 64-symbol data extracted from the map symbol extracting unit 301 are outputted to the maximum value finding unit 405.

In doing so, the correlation value between a 64-bit Kerdock code generated from the Kerdock encoder 402 and the sixty-four symbols outputted from the serial-to-parallel converting unit 403 is found by inverting a sign of the corresponding symbol and by adding all the selectively inverted symbols together. Hence, the symbol correlating unit 404 can include an adder.

The maximum value finding unit 405 selects a maximum value from the 4,096 correlation values and outputs the count value of the 12-bit counter 401 corresponding to the maximum value to the map deciding unit 303 as the Kerdock-decoded map data. For instance, if the correlation value is the maximum value in case of 3,005 of the count value of the 12-bit counter 401, '3,005' becomes 12-bit enhanced mode map data decoded and outputted from the (64,12) Kerdock decoder 302.

Namely, since the currently received map information is used in a next frame, the result can be obtained by the above-explained simple repetitive decoding method.

In doing so, the maximum value finding unit 405 can simultaneously output the Kerdock-decoded 12-bit enhanced mode map data and correlation reliability information (reliability index) for decoding to the map deciding unit 303.

The correlation reliability information (reliability index) can be generated using the correlation values calculated in the process of Kerdock decoding. A maximum correlation value, a difference between the maximum correlation value and a second biggest correlation value or the like can be the correlation reliability information for example.

Meanwhile, the enhanced mode map is constructed with total twenty-four bits. In particular, the enhanced mode map includes a pair of 12-bit data, i.e., Kerdock-decoded 12-bit data received in the odd field and Kerdock-decoded 12-bit data received in the even field. In the odd field, the currently used map data is transmitted by 10-bit. In the even field, the map data to be changed in the future is transmitted by 10-bit. The rest two bits of the odd field and the rest two bits of the even field are used as a 4-bit frame counter. Namely, the 4-bit frame counter means a frame countdown from a current map until changing to a next map. And, each two bits of the 4-bit frame counter are transmitted in the odd or even field.

In this case, the map change is enabled each 16-data frame. If there is no map change, a frame counter value is maintained 15. And, the map data inserted in the even field is equal to the map data inserted in the odd field. Yet, if there is a map change, the frame counter is decremented by 1 of frame unit. And, the map data inserted in the even field is different from the map data inserted in the odd field.

The 10-bit map data includes a 9-bit map number and a 1-bit packing mode. The map number includes information about a segment (or 188-byte packets) number of the ½ and ¼ enhanced data multiplexed in one data field. The packing mode includes information about a multiplexing method between the main data and the enhanced data or between the ½ enhanced data and the ¼ enhanced data.

The map deciding unit 303 decides 10-bit map data used in a current field using the 12-bit enhanced mode map data outputted from the Kerdock decoder 302, the field sync and identifying signals outputted from the frame sync recovering unit 304. In doing so, the map deciding unit 303 includes the map decision for the conventional 8-VSB signal as well as the E8-VSB signal including the map data.

Figure 5A:
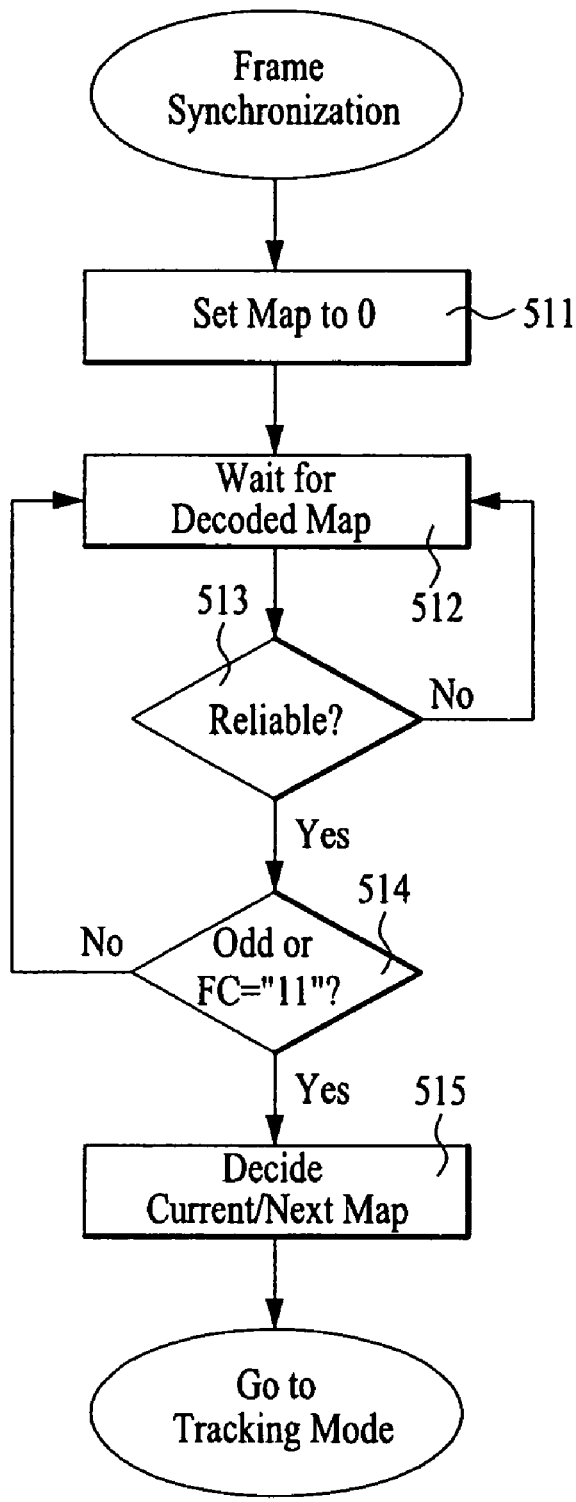
FIG. 5A is a control flowchart of a map acquiring process according to one embodiment of the present invention.
Figure 5B:
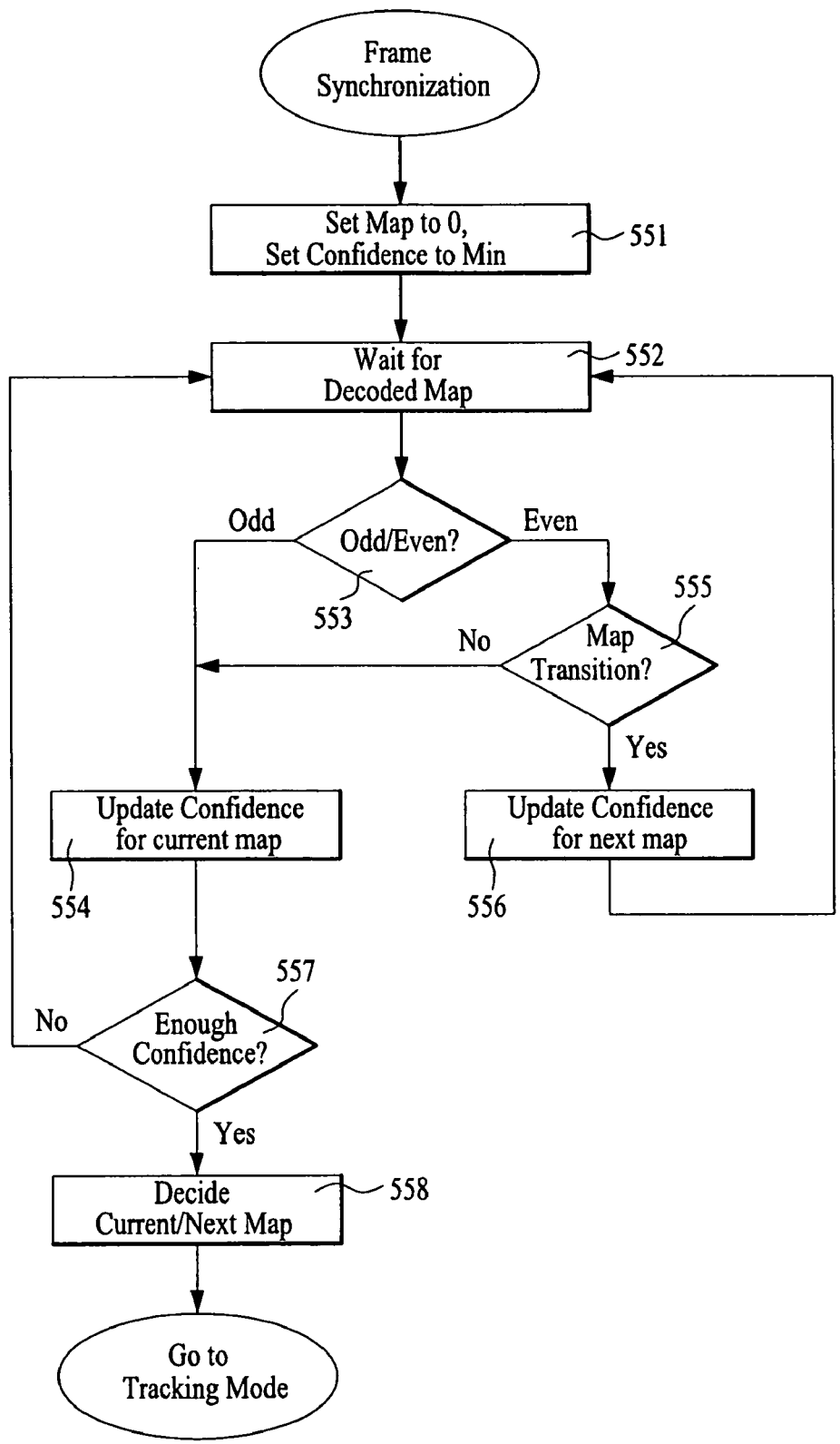
FIG. 5B is a control flowchart of a map acquiring process according to another embodiment of the present invention.
Figure 6:
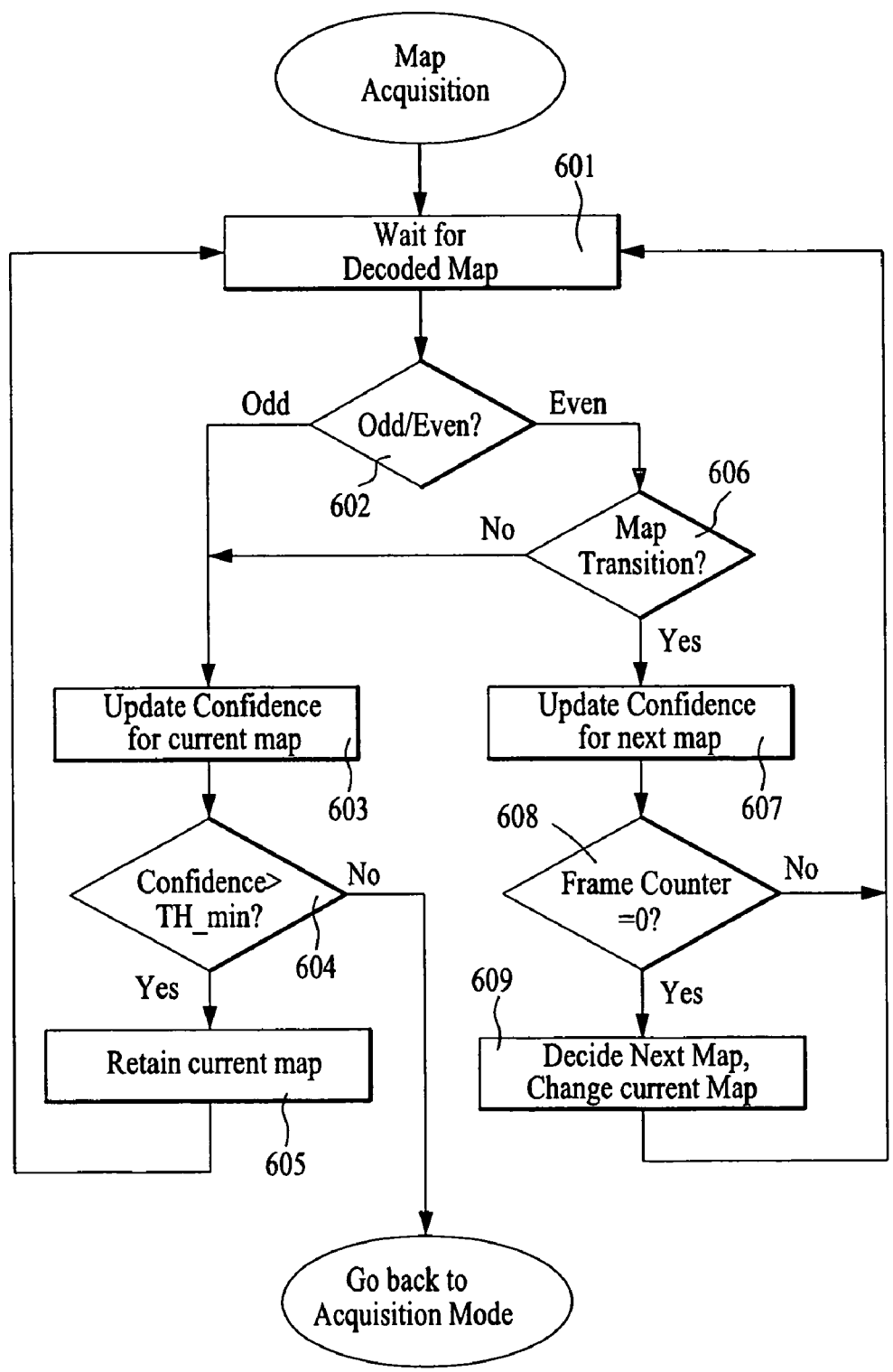
FIG. 6 is a control flowchart of a map tracking process according to one embodiment of the present invention.

The map deciding process is divided into an acquisition mode and a tracking mode, each of which control flowchart is shown in FIG. 5 or FIG. 6.

The map acquiring process can be implemented in various ways. In the present invention, a fast acquisition method and a high-reliability acquisition method are explained for example.

In the map deciding process, two kinds of reliability informations are mainly used. One is correlation reliability information indicating reliability of correlation values, whereas the other is map reliability information indicating reliability of map. To identify the two reliability informations from each other in the present invention, the correlation reliability information is called a reliability index and the map reliability information is called a confidence.

FIG. 5A is a flowchart of a fast map acquiring process according to one embodiment of the present invention, and FIG. 5B is a flowchart of a high-reliability map acquiring process according to one embodiment of the present invention.

Referring to FIG. 5A, once frame synchronization recovery of a VSB signal is achieved, the map deciding unit 303 sets a 10-bit map data value to a basic value of 0 (Step 511) and then waits for a Kerdock decoding result (Step 512). If a correlation reliability value and a 12-bit map data decoded by the Kerdock decoder 302 are outputted after completion of the frame synchronization recovery, the map deciding unit 303 preferentially checks whether the correlation reliability value exceeds a predetermined level (Step 513).

The correlation reliability value is the reliability information generated using correlation values. If the correlation reliability value does not exceed the predetermined level in Step 513, the map deciding unit 303 waits for a map data Kerdock-decoded in a next field sync section while keeping a current map data value set to 0.

Yet, if the correlation reliability value is equal to or greater than the predetermined level and if it is an odd field currently (Step 514), the inputted decoded map data is decided as a current map data (Step 515). Meanwhile, if the correlation reliability value is equal to or greater than the predetermined level and if it is an even field currently (Step 514), it is checked whether every value of a 2-bit frame counter (FC) within the even field is 1 (Step 514). If every bit of the frame counter is 1 in Step 514, the inputted decoded map data is decided as a current map data since it is highly probable that data of a current map is equal to that of a next map (Step 515).

And, the correlation reliability value of the current map data decided in Step 515 is set to an initial value of the current map reliability value for the tracking mode. And in step 515, if there is no idea of the even field, a next map data and its reliability value can be set to the same as those of the current map Yet, if every bit of the frame counter is not 1 in Step 514, the decoded map in the even field is a map to be changed and is not the map that is currently used. Hence, the decoded map is stored as map information to be changed. The correlation reliability at this moment is set to an initial value of a next map reliability value and is then stored together with a frame counter value at this moment. And, the map deciding unit 303 waits for a current map obtained from a next field section.

Once the current and next maps are decided in Step 515, it is switched to a tracking mode.

In most cases, through the above-explained process, by applying a map transmitted from a next field right after the frame synchronization recovery to the E8-VSB reception system, it is able to receive the E8-VSB signal.

In this case, if the initial value of the map data is set to 0 in Step 511 and if the correlation reliability outputted from the Kerdock decoder 302 is low. The decoded map information is ignored. The reason is explained as follows. First of all, in case of the E8-VSB mode that the current field includes no enhanced data but the main data, the map data is 0. Since the 64-symbol map data is not inserted in the field sync segment in the conventional 8-VSB signal, the map data is not 0 in Kerdock decoding. In this case, the correlation reliability is low.

Hence, the E8-VSB reception system can receive the signal transmitted from the conventional 8-VSB transmitter without error.

FIG. 5B is a control flowchart of the map deciding unit 303 enabling a high-reliability acquisition instead of the fast acquisition.

Referring to FIG. 5B, once frame synchronization recovery of an E8-VSB signal is achieved, a current 10-bit map data and a next 10-bit map data are reset to 0. After having reset current and next map reliability (confidence) values to minimum values (Step 551), the map deciding unit 303 waits for a Kerdock decoding result (Step 552). After completion of the frame synchronization recovery, if a 12-bit map data decoded by the Kerdock decoder 302 is inputted, the map deciding unit 303 decides whether a current filed from which the decoded map data is extracted is an odd field or an even field (Step 553).

If the current filed is decided as the odd field in Step 553, the stored current map data and the stored current map reliability value are updated (Step 554).

In updating the current map data and the current map data reliability value, the correlation reliability and the 12-bit map data outputted from the Kerdock decoder 302 can be used. For instance, if the correlation reliability value is equal to or greater than a stored map reliability, the current map data is updated into the inputted decoded map data and the current map reliability value is updated into the inputted correlation reliability value. If the correlation reliability value is smaller than the stored map reliability, the update can be carried out in a manner of keeping the previous value of the stored current map data. For another instance of performing the update, if the stored current map data is equal to the map data outputted from the Kerdock decoder 302, the corresponding correlation reliability value is added to the current map reliability value. Otherwise, the correlation reliability is subtracted from the current map reliability value. In doing so, the update method is an option of a system designer and its application can be implemented in various ways. Hence, the present invention does not put limitation on the above-explained embodiment.

Subsequently, it is decided whether the updated current map reliability value is equal to or greater than a preset critical value (Step 557). If the updated current map reliability value is greater than the preset critical value, the stored current map data is decided as a map that is currently used and the mode is then switched to a tracking mode (Step 558). Otherwise, it goes back to Step 552 to wait for a map data that is Kerdock-decoded in a next filed sync section.

Meanwhile, if the current field is decided as the current even field in Step 553, it is decoded whether a map change occurs (Step 555). The map change can be decided using a 4-bit frame counter. For instance, if every value of the 4-bit frame counter is 1, it is decided that there is no map change.

If it is decided that there is no map change in Step 555, it goes to Step 554 to handle it in the same manner of the odd field. This is because the map data in the even field is equal to the map data in the odd field. Namely, the stored current map data and the current map reliability value are updated using the correlation reliability and the map data outputted from the Kerdock decoder 302. If the current map reliability value is greater than the preset critical value, the stored current map data is used as a map that is currently used. Yet, if the current map reliability value is lower than the critical value, it goes back to Step 552 to wait for a map data Kerdock-decoded in a next field sync section.

Meanwhile, if the map change is decided in Step 555, a next map reliability value for a map to be changed is updated using the correlation reliability and the map data outputted from the Kerdock decoder 302. In doing so, the update method can employ that of the above-explained embodiment or another public-known method (Step 556).

Subsequently, it goes back to Step 552 for waiting for a Kerdock decoding result in a next field sync section. In Step 558, a stored next map data to be changed in Step 556, a corresponding frame counter value and a next map reliability value are stored separate from the current map data and the current map reliability. And, it is switched to a tracking step.

Thus, in FIG. 5B, the current and next map reliability (confidence) variables are added for high-reliability map acquisition. Hence, the decision of the higher-reliability initial map data can be made.

FIG. 6 is a control flowchart of a map tracking process of the map deciding unit 303 according to one embodiment of the present invention.

Referring to FIG. 6, in the tracking mode, by receiving a 10-bit map data, which was decided in the acquisition mode and is currently used, and a reliability value (confidence) of the corresponding map, the tracking is initiated. In doing so, in case of a map change section, by receiving a 10-bit map data to be used next, a next map reliability value and a frame counter value in addition, the tracking is initiated.

In particular, if a Kerdock-decoded 12-bit map data, which is extracted in a next field sync section after the current and next map data are decided in the acquisition mode, and correlation reliability are inputted (Step 601), it is decided whether a current field is an odd field or an even field (Step 602). If it is the odd field of if it is the even field without map change, a current map reliability value is updated using the Kerdock-decoded map data and the correlation reliability (Step 603).

For instance, if a stored current map data is equal to the inputted Kerdock-decoded map data, the correlation reliability or predetermined value is added to the current map reliability value. Otherwise, the correlation reliability or predetermined value is subtracted from the current map reliability value.

Subsequently, if the current map reliability value is equal to or greater than a preset critical value (Step 604), the currently used 10-bit map data is maintained as it is. Otherwise, it goes back to the acquisition mode (Step 605).

Meanwhile, if it is decided in Step 602 that the current field is the even field with map change (Step 606), a next map data having the highest reliability is stored by updating a next map data for a map to be changed and a next map reliability value (Step 607).

In Step 606, a decision of the map change is made using a frame counter. And, the updates of the next map data and the next map reliability value are carried out using the inputted Kerdock-decoded map data and the correlation reliability.

The next map data and the next map reliability in changing the map can be updated in various ways. For instance, a highest value of the correlation reliability in the inputted map data is maintained as the next map reliability value and the corresponding map data is stored as the next map data. For another instance, a map data most frequently appearing from the inputted map data is selected to be stored as the next map data. For further instance, correlation reliability is raised by adding correlation reliabilities of the same map data among the inputted map data together and the map data having a maximum value is selected to be stored.

After completion of the updates of the next map data and the next map reliability in Step 607, it is decided whether a frame counter value is 0 (step 608). Since a map will be changed in a next frame if the frame counter value is 0, the stored next map data is changed into a current map data (Step 609). Alternatively, a current map data can be decided using 10-bit map data, which were extracted in the even field so far and are Kerdock-decoded, and the correlation reliability.

Thus, the 10-bit current map data decided in the acquisition and tracking modes of the map deciding unit 303 is outputted to the map interpreting unit 305.

And, the map interpreting unit 305 converts the 10-bit current map data to significant information using a previously stored lookup table.

Figure 7:
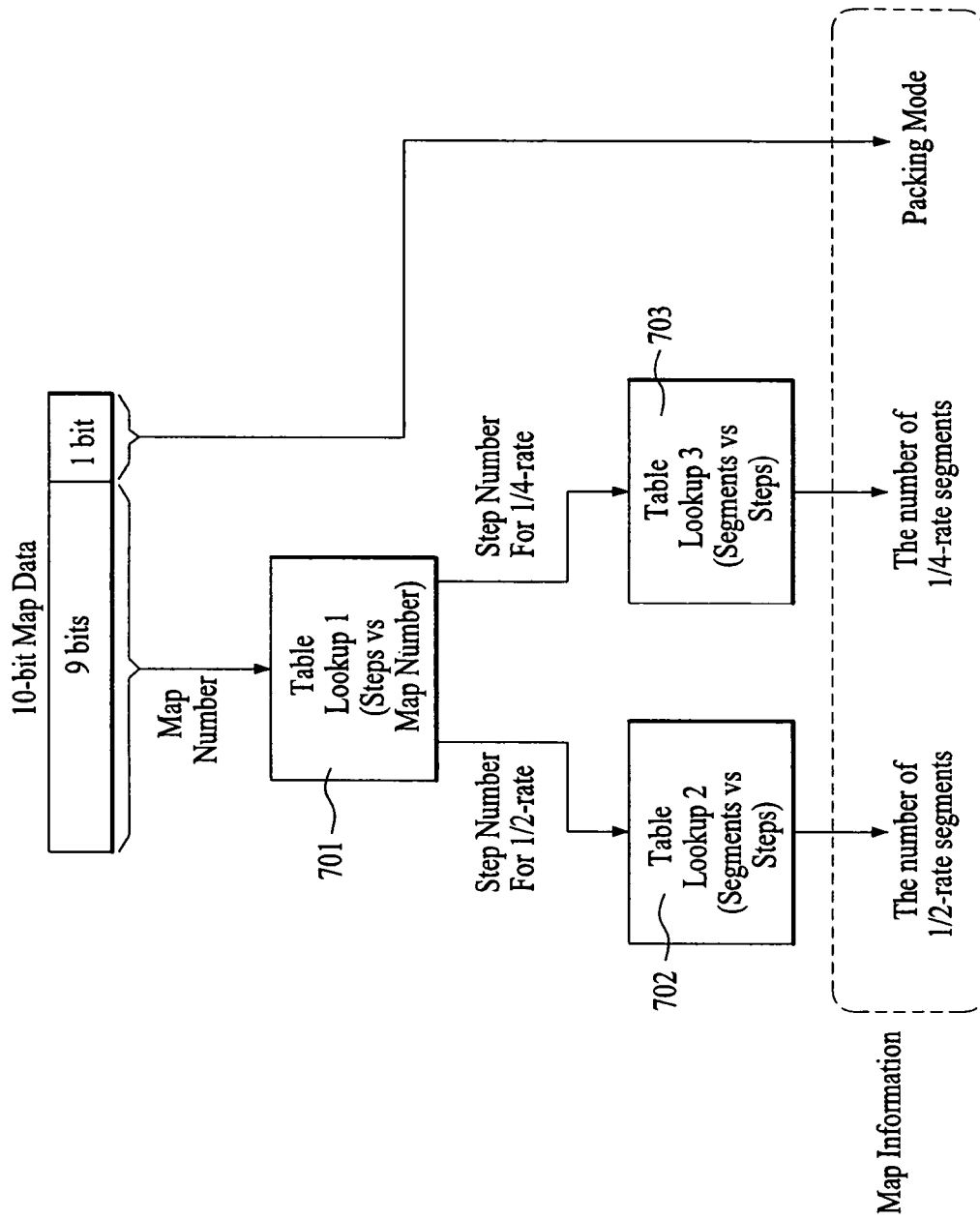
FIG. 7 is a detailed block diagram of a map interpreting unit in FIG. 3.

FIG. 7 is a detailed block diagram of the map interpreting unit 305, in which first to third lookup tables 701 to 703 are used.

Referring to FIG. 7, as mentioned in the foregoing description, first nine bits of a 10-bit map data outputted from the map deciding unit 303 means a map number and the rest one bit indicates a packing mode. In this case, the 9-bit map number includes information about segment (188-byte packets) numbers of the main data, ½ enhanced data and ¼ enhanced data multiplexed within one data field. The packing mode includes information about a multiplexing method between the main data and the enhanced data and a multiplexing method between the ½ enhanced data and the ¼ enhanced data. In this case, the number of combinations enabling the multiplexing among the main data, the ½ enhanced data and the ¼ enhanced data is 512.

The 9-bit map number is inputted to a first lookup table 701. And, the first lookup table outputs step numbers of the ½ and ¼ enhanced data corresponding to the 9-bit map number, respectively. For instance, the first lookup tale 701 stores the table D5.3 in A/53, Amendment No. 1 of the ATSC DTV standard.

The ½ step number is outputted to the second lookup table 702, while the ¼ step number is outputted to the third lookup table 703.

The second lookup table 702 outputs the ½ enhanced segment number within one field corresponding to the ½ step number, while the third lookup table 703 outputs the ¼ enhanced segment number within one field corresponding to the ¼ step number. For instance, the second and third lookup tables 702 and 703 include the tables D5.4a and D5.4b in A/53, Amendment No. 1 of the ATSC DTV standard, respectively.

The map information including the segment numbers of the ½ and ¼ enhanced data outputted from the second and third lookup tables 702 and 703 and the packing mode is used for the channel equalizing unit 206 and the channel decoder 207 through E8-VSB data attribute generating unit 205.

Meanwhile, the terminologies used in the description of the present invention are defined by considering functions in the present invention and can be varies according to the intentions of those skilled in the art or usages. Hence, the definitions should be taken into consideration based on the overall contents of the present invention.

Accordingly, the present invention provides the following effects or advantages.

First of all, the Kerdock decoder can be implemented using the simple correlation values.

Secondly, the conventional 8VSB signal including no map can be received using the reliability of the Kerdock decoder.

Thirdly, the reliability of the map decision can be raised using the reliability of the Kerdock decoder.

Fourthly, by making the map decision for the case of map change or for the case of no map change, the map acquisition and tracking are enabled suitable for each of the cases.

Fifthly, the highly reliable map recovery can be achieved using the reliability-enhanced map acquisition method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for recovering map information in a reception system, which recovers enhanced mode map information including multiplexing information of enhanced data and main data, the apparatus comprising:

a frame synchronization recovering unit for generating a field sync signal and a field identifying signal indicating an even field or an odd field from an input data symbol by performing a frame synchronization recovery;

a symbol extracting unit for extracting map symbols corresponding to an enhanced mode map transmitted by being inserted in the field sync signal from the input data symbol using an output of the frame synchronization recovering unit, the symbol extracting unit for outputting the extracted map symbols intact if the odd field is indicated, the symbol extracting unit for inverting values of the map symbols to output if the even field is indicated;

a Kerdock decoder for outputting Kerdock-decoded map data and a corresponding correlation reliability value using correlation between the map symbols output from the symbol extracting unit and each Kerdock code generated in the Kerdock decoder, the Kerdock decoder comprising a symbol correlating unit for performing a process to calculate and to output a correlation value between each Kerdock code and the map symbols;

a map deciding unit for identifying whether a current field is the odd field or the even field by receiving the field sync signal and the field identifying signal from the frame synchronization recovering unit and by receiving the Kerdock-decoded map data and the correlation reliability value from the Kerdock decoder, the map deciding unit for deciding map data to be used for the current field by identifying whether there is a map change if the even field is indicated; and a map interpreting unit for detecting enhanced segment information inserted in one field and a packing mode from the current map data decided by the map deciding unit, wherein the symbol correlating unit finds the correlation value between the map symbols and each Kerdock code by inverting a sign of a corresponding map symbol according to a sign of the Kerdock code and by adding the selectively inverted symbols together.

2. The apparatus of claim 1, the Kerdock decoder further comprising:
  a serial-to-parallel converting unit for storing the map symbols corresponding to the enhanced mode map output in serial from the symbol extracting unit and then for outputting the stored map symbols in parallel;
  a counter for sequentially counting to a value of a preset range to output count values;
  a Kerdock encoder for outputting Kerdock codes by performing Kerdock encoding on the count values output from the counter; and
  a maximum value finding unit for selecting a count value corresponding to a maximum value among the correlation values calculated and output from the symbol correlating unit as the Kerdock-decoded map data, the maximum value finding unit for outputting the selected map data and a corresponding correlation value,
  wherein the symbol correlating unit calculates and outputs the correlation values between the Kerdock codes output from the Kerdock encoder and the map symbols output in parallel from the serial-to-parallel converting unit on all the Kerdock codes corresponding to the count values output from the counter.

3. The apparatus of claim 2, wherein the maximum value finding unit generates the correlation reliability value using a relation between the correlation values calculated and output from the symbol correlating unit.

4. The apparatus of claim 1, the Kerdock decoder further comprising:
  a serial-to-parallel converting unit for storing sixty-four map symbols corresponding to the enhanced mode map output in serial from the symbol extracting unit and then for outputting the stored map symbols in parallel;
  a 12-bit counter for sequentially generating count values 0 to 4095 and for outputting the count values if the sixty-four symbols are entirely stored in the serial-to-parallel converting unit;
  a Kerdock encoder for outputting 64-bit Kerdock codes by performing (64,12) Kerdock encoding on the count values output from the 12-bit counter; and
  a maximum value finding unit for selecting a count value corresponding to a maximum value among the 4,096 correlation values calculated and output from the symbol correlating unit as the Kerdock-decoded map data to output, the maximum value finding unit for generating and outputting a corresponding correlation reliability value from a relation between the correlation values,
  wherein the symbol correlating unit calculates and outputs correlation values between the 64-bit Kerdock codes output from the Kerdock encoder and the sixty-four map symbols output in parallel from the serial-to-parallel converting unit on all of the Kerdock codes corresponding to the 4,096 count values output from the 12-bit counter.

5. The apparatus of claim 1, wherein it deciding that the correlation reliability value input together with the Kerdock-decoded map data is equal to or greater than a preset first critical value and if deciding that the current field is the odd field or the even field without the map change, the map deciding unit decides the Kerdock-decoded map data as the current map data to output.

6. The apparatus of claim 1, wherein if deciding that the current field is the odd field or the even field without the map change, the map deciding unit updates a stored map data and a stored map reliability value using the input Kerdock-decoded map data and correlation reliability value and wherein if the updated map reliability value is equal to or greater than a preset second critical value, the map deciding unit decides the current map data from the stored map data to output.

7. The apparatus of claim 5, wherein if the current map data is decided by an initial acquisition process, the map deciding unit decides whether the map change exists each time the Kerdock-decoded map data and the correlation reliability value are input, wherein if the map change does not exist, the map deciding unit updates a current map reliability value to decide whether to maintain the current map data, and wherein if the map change exists, the map deciding unit updates a next map reliability value to change a next map data having a highest reliability in the map change into the current map data.

8. A method of recovering map information in a reception system, which recovers enhanced mode map information including multiplexing information of enhanced data and main data, the method comprising:
  generating a field sync signal and a field identifying signal indicating an even field or an odd field from an input data symbol by performing a frame synchronization recovery;
  extracting map symbols corresponding to an enhanced mode map transmitted by being inserted in the field sync signal from the input data symbol using the field sync signal and the field identifying signal, outputting the extracted map symbols intact if the odd field is indicated, and inverting values of the map symbols to output if the even field is indicated;

outputting Kerdock-decoded map data and a corresponding correlation reliability value using correlation between the map symbols and each generated Kerdock code;

determining a current map data by performing map acquisition and tracking processes according to whether a current field is the odd field or the even field and whether there is a map change by receiving the field sync signal, the field identifying signal, the map data and the correlation reliability value; and detecting enhanced segment information inserted in one field and a packing mode from the determined current map data, wherein determining the current map data by performing tracking processes comprises:

initializing current and next map reliability values using the correlation reliability value used in the map acquisition process;

updating a stored current map reliability value using the Kerdock-decoded map data and the correlation reliability value if the Kerdock-decoded map data and the correlation reliability value are input and if the current field is determined as the odd field or the even field without the map change;

maintaining the current map data determined in the acquisition process as it is if the updated current map reliability value exceeds a preset first critical value;

returning to an acquisition mode if the updated current map reliability value does not exceed the preset first critical value;

if the current field is determined as the even field with the map change, storing a next map data having a highest reliability by updating a stored next map data and a stored next map reliability value using the input Kerdock-decoded map data and the correlation reliability value; and changing the stored next map data into the current map data if it is decided that a map will be changed in a next frame.

9. The method of claim 8, wherein outputting the Kerdock-decoded map data and the corresponding correlation reliability value comprises:

storing N map symbols corresponding to the enhanced mode map output in serial and then outputting the stored map symbols in parallel;

sequentially counting to a value of a preset range to output count values;

outputting N-bit Kerdock codes by performing Kerdock encoding on the count values;

calculating and outputting correlation values between the N-bit Kerdock codes and the N map symbols output in parallel on all of the Kerdock codes corresponding to the count values; and selecting the count value corresponding to a maximum value among the correlation values calculated and output as the Kerdock-decoded map data to output and generating and outputting a corresponding correlation reliability value from a relation between the correlation values.

10. The method of claim 8, wherein determining a current map data by performing the map acquisition comprises:

initializing a stored current map data value to 0;

determining whether the correlation reliability value exceeds a preset second critical value if the Kerdock-decoded map data and the correlation reliability value are input;

deciding the input Kerdock-decoded map data as the current map data to store and to output if the correlation reliability value exceeds the second critical value and if the current field is the odd field or the even field without the map change; the inputted Kerdock decoded map data as the current map data to store and to output; and storing the input Kerdock-decoded map data as a next map data if the correlation reliability value exceeds the second critical value and if the current field is the even field with the map change.

11. The method of claim 8, wherein determining a current map data by performing the map acquisition comprises:

resetting stored current and next map data values to 0 and resetting stored current and next map reliability values to a minimum value;

if the Kerdock-decoded map data and the correlation reliability value are input and if it is decided that the current field is the odd field or the even field without the map change, storing the current map data having a highest reliability by updating the stored current map data and the stored current map reliability value using the Kerdock-decoded map data and the correlation reliability value; and determining the stored current map data as map data to be used for the current field if the updated current map reliability value exceeds a preset third critical value.

12. The method of claim 11, wherein determining a current map data by performing the map acquisition further comprises:

updating the stored next map data and the stored next map reliability value using the input Kerdock-decoded map data and the correlation reliability value if it is decided that the current field is the even field with the map change; and storing the next map data using the updated next map reliability value.

13. The method of claim 8, wherein outputting the Kerdock-decoded map data and the corresponding correlation reliability value is carried out using a frame counter value allocated to a lower bit of the input Kerdock-decoded map data.

14. A method of recovering map information in a reception system, which recovers enhanced mode map information including multiplexing information of enhanced data and main data, the method comprising:

generating a field sync signal and a field identifying signal indicating an even field or an odd field from an input data symbol by performing a frame synchronization recovery;

extracting map symbols corresponding to an enhanced mode map transmitted by being inserted in the field sync signal from the input data symbol using the field sync signal and the field identifying signal, outputting the extracted map symbols intact if the odd field is indicated, and inverting values of the map symbols to output if the even field is indicated;

outputting Kerdock-decoded map data using correlation between the map symbols and each generated Kerdock code, wherein outputting the Kerdock-decoded map data comprises calculating and outputting correlation values between N-bit Kerdock codes and the map symbols by inverting a sign of a corresponding map symbol according to a sign of a N-bit Kerdock code and by adding the selectively inverted symbols together;

determining a current map data by performing map acquisition and tracking processes according to whether a current field is the odd field or the even field and whether there is a map change by receiving the field sync signal, the field identifying signal and the Kerdock-decoded map data; and detecting enhanced segment information inserted in one field and a packing mode from the determined current map data.

15. The method of claim 14, wherein outputting the Kerdock-decoded map data comprises:

storing N map symbols corresponding to the enhanced mode map output in serial and then outputting the stored N map symbols in parallel;

sequentially counting to a value of a preset range to output count values;

outputting the N-bit Kerdock codes by performing Kerdock encoding on the count values; and selecting a count value corresponding to a maximum value among the calculated and output correlation values as the Kerdock-decoded map data to output, wherein the process of calculating and outputting correlation values between the N-bit Kerdock codes and the N map symbols is performed on each of the N-bit Kerdock codes corresponding to the count values.

16. A method of recovering map information in a reception system, which recovers enhanced mode map information including multiplexing information of enhanced data and main data, the method comprising:

generating a field sync signal and a field identifying signal indicating an even field or an odd field from an input data symbol by performing a frame synchronization recovery;

extracting map symbols corresponding to an enhanced mode map transmitted by being inserted in the field sync signal from the input data symbol using the field sync signal and the field identifying signal, outputting the extracted map symbols intact if the odd field is indicated, and inverting values of the map symbols to output if the even field is indicated;

outputting Kerdock-decoded map data using correlation between the map symbols and each generated Kerdock code;

determining current map data by performing map acquisition and tracking processes according to whether a current field is the odd field or the even field and whether there is a map change by receiving the field sync signal, the field identifying signal and the Kerdock-decoded map data; and detecting enhanced segment information inserted in one field and a packing mode from the decided current map data, wherein determining the current map data by performing map acquisition comprises:

resetting stored current and next map data values to 0 and resetting stored current and next map reliability values to a minimum value;

if the Kerdock-decoded map data and the correlation reliability value are input and if it is decided that the current field is the odd field or the even field without the map change, storing the current map data having a highest reliability by updating the stored current map data and the stored current map reliability value using the Kerdock-decoded map data and the correlation reliability value; and determining the stored current map data as map data to be used for the current field if the updated current map reliability value exceeds a preset first critical value, updating the stored next map data and the stored next map reliability value using the input Kerdock-decoded map data if the current field is the even field with the map change; and deciding to store the next map data using the updated next map reliability value.

17. The method of claim 16, wherein determining the current map data by performing the tracking processes comprises:

updating the stored current map reliability value using the Kerdock-decoded map data after completion of the map acquisition process if the Kerdock-decoded map data and the correlation reliability value are input and if the current field is the odd field or the even field without the map change;

maintaining the current map data determined in the acquisition process if the updated current map reliability value exceeds a preset second critical value;

returning to an acquisition mode if the updated current map reliability value does not exceed the preset second critical value;

storing a next map data having a highest reliability by updating the stored next map data and the stored next map reliability value using the input Kerdock-decoded map data if the current field is the even field with the map change; and changing the stored map data into the current map data if it is determined that a map will be changed in a next frame.

18. An apparatus for recovering map information in a reception system, which recovers enhanced mode map information including multiplexing information of enhanced data and main data, the apparatus comprising:

a frame synchronization recovering unit for generating a field sync signal and a field identifying signal indicating an even field or an odd field from an input data symbol by performing a frame synchronization recovery;

a symbol extracting unit for extracting map symbols corresponding to an enhanced mode map transmitted by being inserted in the field sync signal from the input data symbol using an output of the frame synchronization recovering unit, the symbol extracting unit for outputting the extracted map symbols intact if the odd field is indicated, the symbol extracting unit for inverting values of the map symbols to output if the even field is indicated;

a Kerdock decoder for outputting Kerdock-decoded map data and a corresponding correlation reliability value using correlation between the map symbols output from the symbol extracting unit and each Kerdock code generated in the Kerdock decoder;

a map deciding unit for identifying whether a current field is the odd field or the even field by receiving the field sync signal and the field identifying signal from the frame synchronization recovering unit and by receiving the Kerdock-decoded map data and the correlation reliability value from the Kerdock decoder, the map deciding unit for deciding map data to be used for the current field by identifying whether there is a map change in case of the even field; and a map interpreting unit for detecting enhanced segment information inserted in one field and a packing mode from the current map data decided by the map deciding unit, wherein the map deciding unit determines the Kerdock-decoded map data as the current map data to output if the correlation reliability value input together with the Kerdock-decoded map data is equal to or greater than a preset first critical value and if the current field is the odd field or the even field without the map change, wherein if the current map data is determined by an initial acquisition process, the map deciding unit determines whether the map change exists each time the Kerdock-decoded map data and the correlation reliability value are input, wherein the map deciding unit updates a current map reliability value to determine whether to maintain the current map data if the map change does not exist, and wherein the map deciding unit updates a next map reliability value to change a next map data having a highest reliability in the map change into the current map data if the map change exists.

19. An apparatus for recovering map information in a reception system, which recovers enhanced mode map information including multiplexing information of enhanced data and main data, the apparatus comprising:

a frame synchronization recovering unit for generating a field sync signal and a field identifying signal indicating an even field or an odd field from an input data symbol by performing a frame synchronization recovery;

a symbol extracting unit for extracting map symbols corresponding to an enhanced mode map transmitted by being inserted in the field sync signal from the input data symbol using an output of the frame synchronization recovering unit, the symbol extracting unit for outputting the extracted map symbols intact if the odd field is indicated, the symbol extracting unit for inverting values of the map symbols to output if the even field is indicated;

a Kerdock decoder for outputting Kerdock-decoded map data and a corresponding correlation reliability value using correlation between the map symbols output from the symbol extracting unit and each Kerdock code generated in the Kerdock decoder;

a map deciding unit for identifying whether a current field is the odd field or the even field by receiving the field sync signal and the field identifying signal from the frame synchronization recovering unit and by receiving the Kerdock-decoded map data and the correlation reliability value from the Kerdock decoder, the map deciding unit for determining map data to be used for the current field by identifying whether there is a map change if the even field is indicated; and a map interpreting unit for detecting enhanced segment information inserted in one field and a packing mode from the current map data decided by the map deciding unit, wherein the map deciding unit updates a stored map data and a stored map reliability value using the input Kerdock-decoded map data and correlation reliability value if the current field is the odd field or the even field without the map change, and wherein the map deciding unit determines the current map data from the stored map data to output if the updated map reliability value is equal to or greater than a preset first critical value, wherein the map deciding unit determines whether the map change exists each time the Kerdock-decoded map data and the correlation reliability value are input if the current map data is determined by an initial acquisition process, wherein the map deciding unit updates a current map reliability value to determine whether to maintain the current map data it the map change does not exist, and wherein the map deciding unit updates a next map reliability value to change a next map data having a highest reliability in the map change into the current map data if the map change exists.

20. The apparatus of claim 6, wherein if the current map data is decided by an initial acquisition process, the map deciding unit decides whether the map change exists each time the Kerdock-decoded map data and the correlation reliability value are input, wherein if the map change does not exist, the map deciding unit updates a current map reliability value to decide whether to maintain the current map data, and wherein if the map change exists, the map deciding unit updates a next map reliability value to change a next map data having a highest reliability in the map change into the current map data.

* * * * *